(12) United States Patent
Schilling

(10) Patent No.: US 8,517,661 B2
(45) Date of Patent: Aug. 27, 2013

(54) VARIABLE VANE ASSEMBLY FOR A GAS TURBINE ENGINE HAVING AN INCREMENTALLY ROTATABLE BUSHING

(75) Inventor: Jan Christopher Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 2006 days.

(21) Appl. No.: 11/656,321

(22) Filed: Jan. 22, 2007

(65) Prior Publication Data

US 2013/0101385 A1    Apr. 25, 2013

(51) Int. Cl.
*F01D 17/14*    (2006.01)
*F01D 25/16*    (2006.01)

(52) U.S. Cl.
USPC ............ 415/1; 415/149.4; 415/160; 415/162; 384/261; 384/263; 384/271

(58) Field of Classification Search
USPC ................. 384/247, 261, 263, 271; 415/159, 415/162, 163, 149.4, 1, 160
See application file for complete search history.

(56) References Cited

U.S. PATENT DOCUMENTS

| | | | |
|---|---|---|---|
| 5,277,544 A | 1/1994 | Naudet | |
| 5,308,226 A | 5/1994 | Venkatasubbu et al. | |
| 5,593,275 A | 1/1997 | Venkatasubbu et al. | |
| 6,474,941 B2 | 11/2002 | Dingwell et al. | |
| 6,767,183 B2 | 7/2004 | Schilling et al. | |
| 6,808,364 B2 | 10/2004 | O'Reilly et al. | |
| 6,887,035 B2 * | 5/2005 | Bruce | 415/160 |
| 7,112,040 B2 * | 9/2006 | Debeneix et al. | 415/160 |
| 7,214,030 B2 | 5/2007 | Arilla et al. | |

FOREIGN PATENT DOCUMENTS

| | | |
|---|---|---|
| JP | 05-240067 A | 9/1993 |
| JP | 09-105309 A | 4/2003 |
| JP | 2005-036806 A | 2/2005 |

OTHER PUBLICATIONS

Office Action from corresponding Japanese Patent Application No. 2008-009955, dated Oct. 2, 2012.
Office Action from corresponding Great Britain Patent Application No. 0800777.5, dated Apr. 25, 2008.

* cited by examiner

*Primary Examiner* — Christopher Verdier
(74) *Attorney, Agent, or Firm* — General Electric Company; William Scott Andes; Matthew P. Hayden

(57) ABSTRACT

A variable vane assembly for a gas turbine engine having a casing, including: a variable vane including a platform and a vane stem extending outwardly from the platform; a bushing surrounding the vane stem; a lever for moving the vane between a closed position and an open position; and, a mechanism for incrementally rotating the bushing to a new circumferential position with respect to the vane stem as the vane is cycled each time between the closed and open positions.

20 Claims, 7 Drawing Sheets

VARIABLE VANE ASSEMBLY FOR A GAS TURBINE ENGINE HAVING AN INCREMENTALLY ROTATABLE BUSHING

BACKGROUND OF THE INVENTION

The present invention relates generally to a variable vane assembly and, in particular, to a variable vane assembly which provides incremental rotation to a bushing therein during each cycle of opening and closing the vane.

Variable geometry compression systems are used in today's aircraft engines and industrial powerplants. This enables the amount of air flowing through the compressor to be controlled, thereby facilitating optimal performance of such compressor. More specifically, a plurality of variable stator vane assemblies are typically provided between rows of axially spaced rotor blades.

It will be understood that several types of loads are imposed upon each variable vane assembly during high power operation. The aerodynamic loading on the vane includes a forward axial load and a tangential load in the direction of rotation. An axial pressure load is also applied if the vane has an inner support. Accordingly, the axial and tangential forces combine at each journal position to create a reaction load. It has been found that a bushing in the variable stator vane assembly tends to wear prematurely in a certain area which correlates to where the reaction load peaks in combination with time spent in or around that journal position. As these bushings wear, large clearance areas are exposed opposite the wear side which can leak large amounts of air. The high pressure, high temperature air escaping through the clearance results in reduced performance, as well as a thermal burden to the area outside the casing. Further, erosion of the bushing material can also occur.

Accordingly, it would be desirable for a variable vane assembly to be developed which reduces wear and improves the life of the bushing therein. It would also be desirable for such bushing to provide positive sealing at high power conditions and reduce leakage, thereby minimizing erosion of bushing material and resulting performance loss. Further, it would be desirable that such bushing design provide low friction and be easily assembled.

BRIEF SUMMARY OF THE INVENTION

In accordance with a first exemplary embodiment of the invention, a variable vane assembly for a gas turbine engine including a casing is disclosed. The variable vane assembly includes: a variable vane including a platform and a vane stem extending outwardly from the platform; a bushing surrounding the vane stem; a lever for moving the vane between a closed position and an open position; and, a mechanism for incrementally rotating the bushing to a new circumferential position with respect to the vane stem as the vane is cycled each time between the closed and open positions. In particular, the bushing includes a plurality of stepped portions circumferentially spaced about a top surface of the bushing and a plurality of indented stops circumferentially spaced about a side surface of the bushing. A plurality of pawls is associated with the lever, wherein the pawls engage one of the stepped portions of the bushing top surface to cause the bushing to rotate in a first direction a predetermined amount as the vane moves from the closed position to the open position. At least one pawl is also associated with the casing which engages one of the indented stops of the bushing side surface to prevent the bushing from rotating in a second direction opposite the first direction more than a second predetermined amount as the vane moves from the open position to the closed position.

In a second exemplary embodiment of the invention, a method of incrementally rotating a bushing surrounding a vane stem in a variable vane assembly during a cycle of opening and closing a vane thereof is disclosed as including the following steps: incorporating a mechanism for engaging the bushing; rotating the bushing in a first direction a predetermined amount as the vane moves from a closed position to an open position; and, rotating the bushing in a second direction opposite the first direction less than the predetermined amount as the vane moves from the open position to the closed position. The method further includes the step of incorporating a mechanism for preventing the bushing from rotating in the second direction more than a second predetermined amount. In this way, the bushing is in a new circumferential position with respect to the vane stem after each cycle.

DETAILED DESCRIPTION OF THE INVENTION

Figure 1:
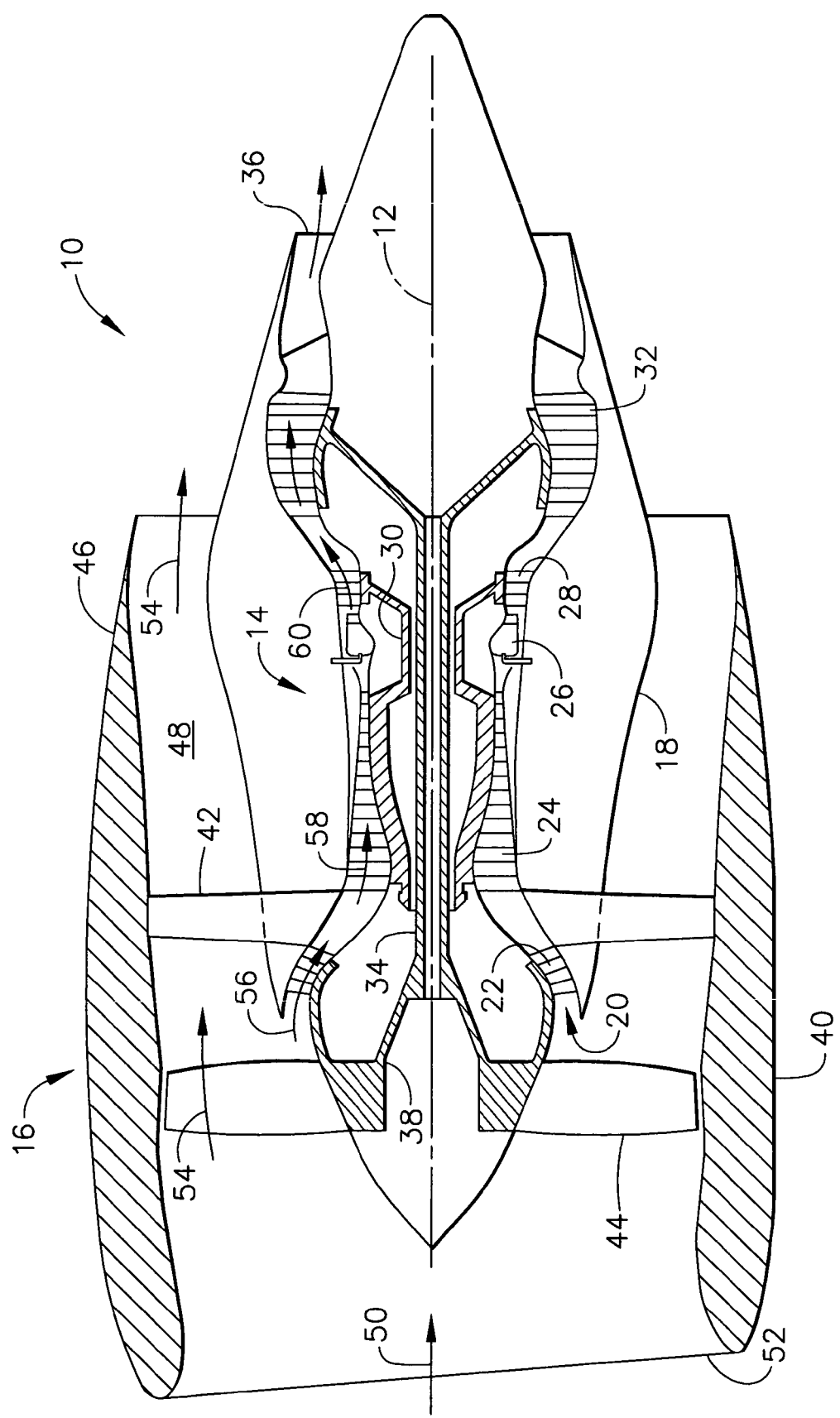
FIG. 1 is a diagrammatic view of a high bypass turbofan gas turbine engine.

Referring now to the drawings in detail, wherein identical numerals indicate the same elements throughout the figures, FIG. 1 depicts in diagrammatic form an exemplary gas turbine engine 10 (high bypass type) utilized with aircraft having a longitudinal or axial centerline axis 12 therethrough for reference purposes. Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses and supports a booster compressor 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream to raise the temperature and energy level of the pressurized air. The high energy combustion products flow from combustor 26 to a first (high pressure) turbine 28 for driving high pressure compressor 24 through a first (high pressure) drive shaft 30, and then to a second (low pressure) turbine 32 for driving booster compressor 22 and fan section 16 through a second (low pressure) drive shaft 34 that is coaxial with first drive shaft 30. After driving each of turbines 28 and 32, the combustion products leave core engine 14 through an exhaust nozzle 36 to provide propulsive jet thrust.

Fan section 16 includes a rotatable, axial-flow fan rotor 38 that is surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 38 and fan rotor blades 44. Downstream section 46 of fan casing 40 extends over an outer portion of core engine 14 to define a secondary, or bypass, airflow conduit 48 that provides additional propulsive jet thrust.

From a flow standpoint, it will be appreciated that an initial air flow, represented by arrow 50, enters gas turbine engine 10 through an inlet 52 to fan casing 40. Air flow 50 passes through fan blades 44 and splits into a first compressed air flow (represented by arrow 54) that moves through conduit 48 and a second compressed air flow (represented by arrow 56) which enters booster compressor 22. The pressure of second compressed air flow 56 is increased and enters high pressure compressor 24, as represented by arrow 58. After mixing with fuel and being combusted in combustor 26, combustion products 60 exit combustor 26 and flow through first turbine 28. Combustion products 60 then flow through second turbine 32 and exit exhaust nozzle 36 to provide thrust for gas turbine engine 10.

Figure 2:
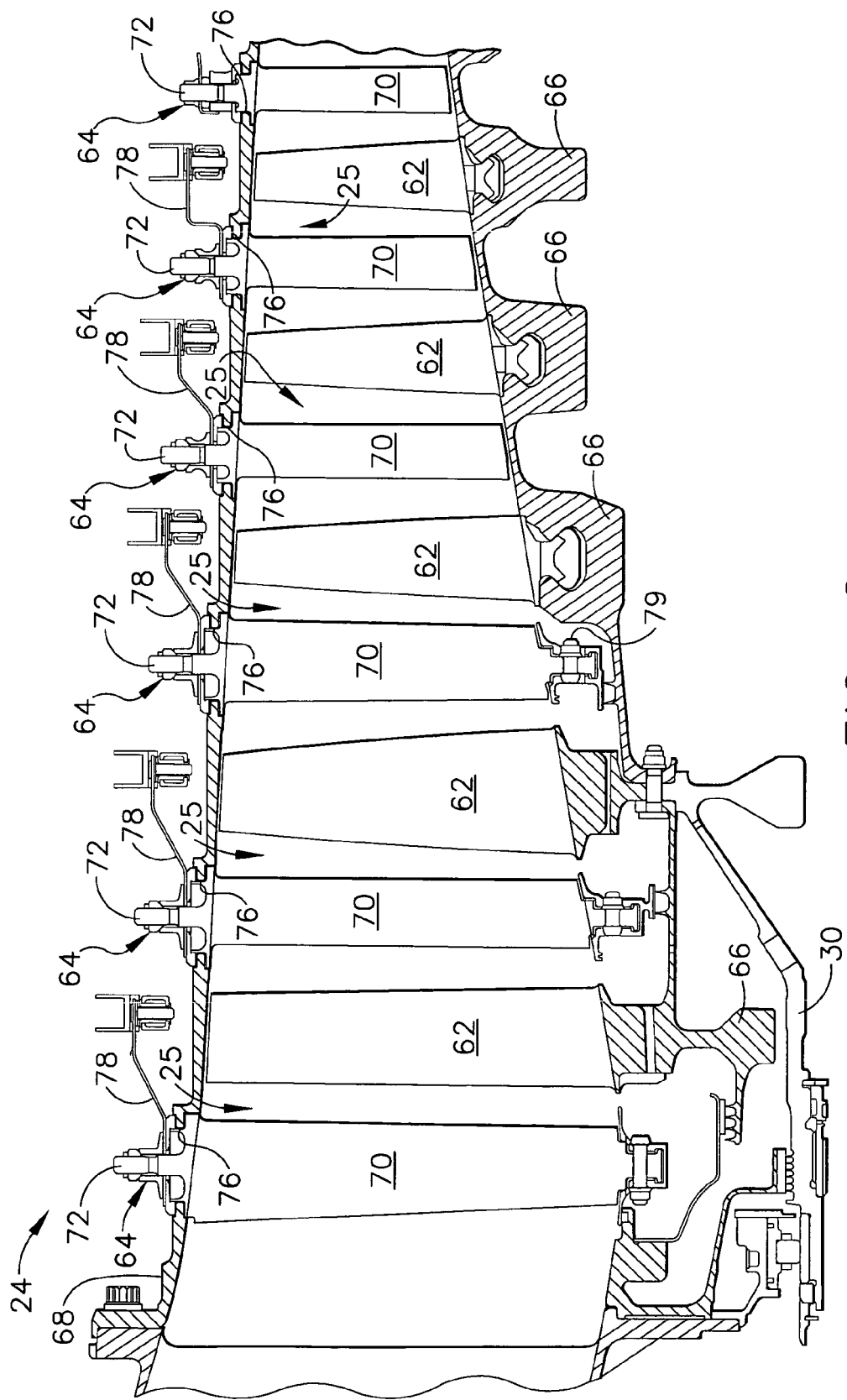
FIG. 2 is a partial schematic view of a compressor for a gas turbine engine.

As seen in FIG. 2, high pressure compressor 24 includes a plurality of stages 25, with each stage further including a row of rotor blades 62 and a row of variable vane assemblies 64. In the exemplary embodiment, rotor blades 62 are supported by rotor disks 66 and are coupled to rotor shaft 30. Rotor shaft 30 is surrounded by a stator casing 68 that extends circumferentially around high pressure compressor 24 and supports variable vane assemblies 64.

Variable vane assemblies 64 each include a variable vane 70 and a vane stem 72 that extends substantially perpendicularly from a vane platform 74. More specifically, vane platform 74 extends between variable vane 70 and vane stem 72. Each vane stem 72 preferably extends through one of a plurality of openings 76 defined in casing 68. It will be seen that each variable vane assembly 64 further includes a lever arm 78 that extends from each variable vane 70 and is utilized to selectively rotate variable vanes 70 about an axis 77 (see FIG. 3) for changing an orientation of vanes 70 relative to the flow path through high pressure compressor 24 to facilitate increased control of air flow through high pressure compressor 24. In addition, at least some vanes 70 are attached to an inner casing 79.

Figure 3:
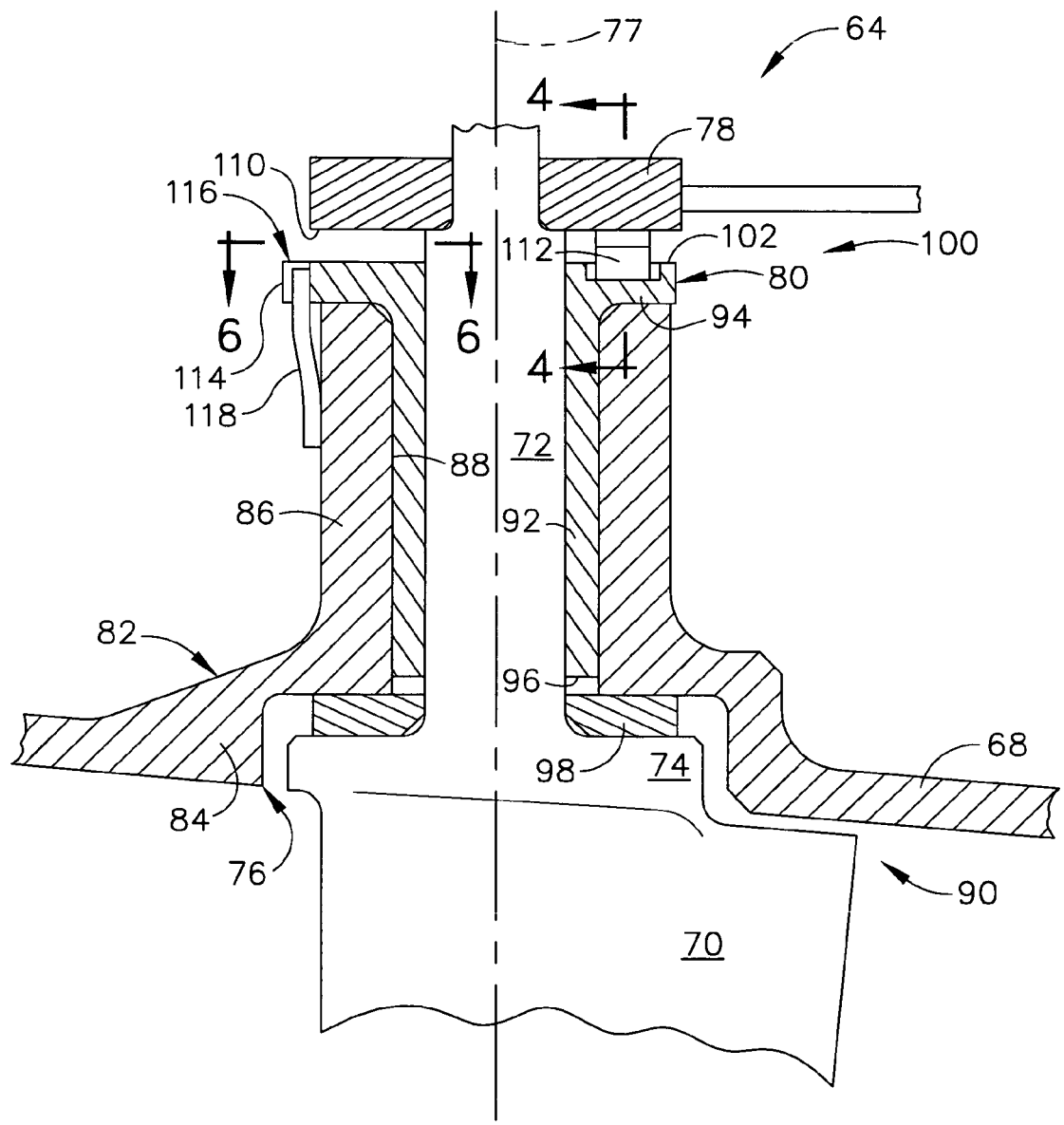
FIG. 3 is an enlarged, partial view of a variable vane assembly shown in FIG. 2.
Figure 4:
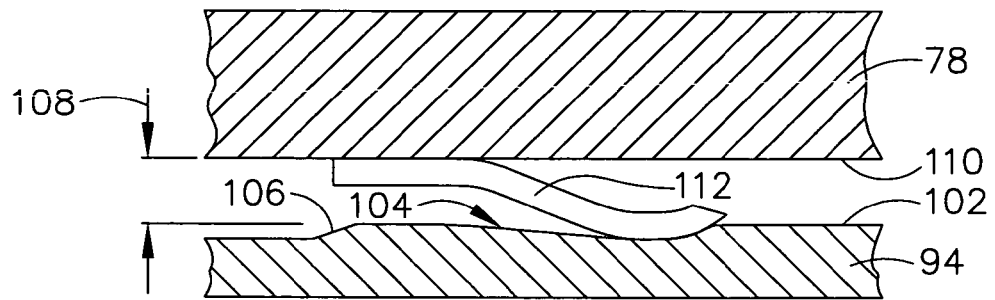
FIG. 4 is an enlarged, partial view of the variable vane assembly shown in FIG. 3 taken along line 4-4 when the vane is in the closed position.
Figure 5:
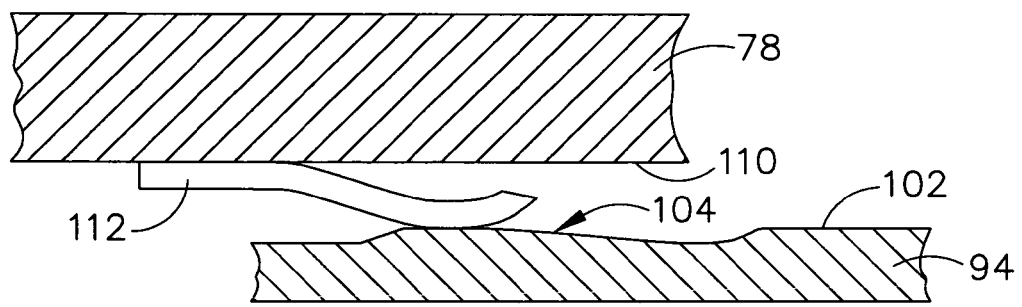
FIG. 5 is an enlarged, partial view of the variable vane assembly shown in FIG. 3 taken along line 4-4 when the vane is in the open position.

As seen in FIG. 3, variable vane assembly 64 further includes a bushing assembly 80 to rotatably couple variable vane 70 to engine casing 68 within casing opening 76. Casing 68 preferably includes a plurality of casing towers 82 which support each variable vane 70 and are spaced circumferentially around engine 10. Each casing tower 82 includes a recessed portion 84 and a substantially cylindrical portion 86 that extends from recessed portion 84. It will be understood that casing tower portions 84 and 86 are defined by an inner wall 88 that also defines opening 76 such that opening 76 extends between a radially inner side 90 of variable vane assembly 64 to a radially outer side (not shown) of variable vane assembly 64. It will be appreciated that due to the diameter of recessed portion 84 is greater than that of cylindrical portion 86 for each casing tower 82, and that cylindrical portion 86 extends substantially perpendicularly outwardly from recessed portion 84.

Further, it will be seen that the diameter of vane stem 72 is preferably smaller than the diameter of casing tower cylindrical portion 86 and that the diameter of vane platform 74 (which is larger than the diameter of vane stem 72) is preferably smaller than the diameter of casing tower recessed portion 84. Accordingly, casing tower cylindrical portion 86 is sized to receive vane stem 72 therein and casing tower recessed portion 84 is sized to receive vane platform 74 therein.

A bushing 92 is shown as being positioned between vane stem 72 and casing tower cylindrical portion 86. Bushing 92, which is preferably fabricated from a material having a low coefficient of friction, includes a top portion 94 located adjacent lever arm 78 which extends above casing tower cylindrical portion 86. It will further be seen that a lower surface 96 of bushing 92 is positioned adjacent vane platform 74 and a washer 98 is preferably located therebetween.

In order to prevent excessive wear on bushing 92 in one area and otherwise extend the life of such item, it is preferred that variable vane assembly 64 include a mechanism 100 which incrementally rotates such bushing 92 during the cycling of variable vane 70 between a closed position and an open position. In this way, bushing 92 moves to a new circumferential position with respect to vane stem 72 so that the reaction loads thereon do not occur continuously at the same location.

It will be seen that a top surface 102 of bushing top portion 94 preferably includes a plurality of circumferentially spaced stepped portions 104 formed thereon. It will be understood that each stepped portion 104 has a transition area 106 therebetween with a preferred angle in a range of approximately 30° to approximately 65°. Further, each stepped portion 104 will have a predetermined gap or spacing 108 between the surface thereof and a bottom surface 110 of lever arm 78.

Figure 6:
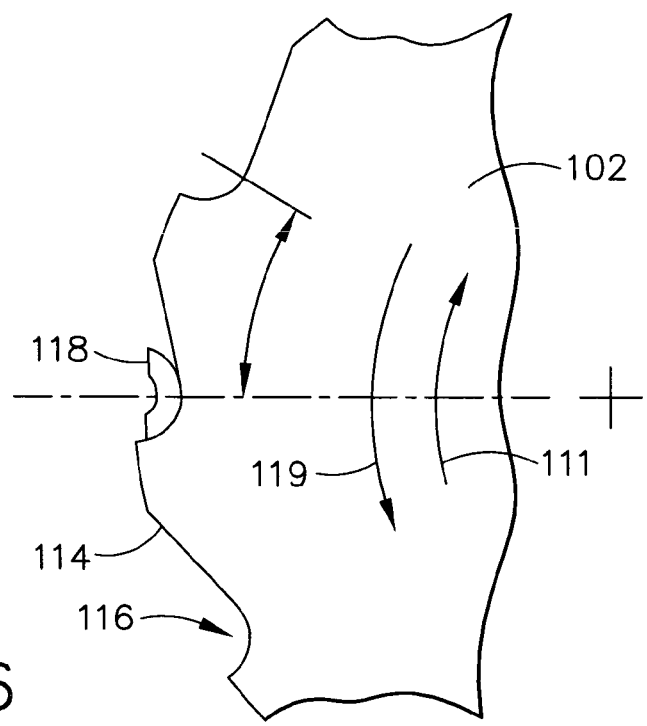
FIG. 6 is an enlarged, partial view of the variable vane assembly shown in FIG. 3 taken along line 6-6.

A plurality of pawls 112 are attached or otherwise associated with lever arm bottom surface 110 which preferably engage bushing top surface 102 to cause bushing 92 to rotate in a first direction (clockwise as shown by arrow 111 in FIG. 6) a predetermined amount as variable vane 70 moves from a closed position to an open position. As will be explained in greater detail hereinafter, lever pawls 112 are preferably spaced closer together than stepped portions 104 on bushing top surface 102. Additionally, it is preferred that the annular spacing between lever pawls 112 be less than the rotation of variable vane 70 between the open and closed positions.

It will also be noted that a side surface 114 of bushing top portion 94 preferably includes a plurality of circumferentially spaced indented stops 116 therearound. Such indented stops 116 on bushing side surface 114 are preferably engagable by at least one pawl 118 associated with cylindrical portion 86 of casing tower 82 as bushing 92 rotates in a second direction opposite the first direction (i.e., counter-clockwise as shown by arrow 119 in FIG. 6) when variable vane 70 is rotated from an open position to a closed position. Because bushing 92 is prevented from rotating in second direction as much as its initial rotation in the first direction, it will be appreciated that bushing 92 has been incrementally rotated or indexed a desired circumferential amount from when variable vane was previously in the closed position.

This incremental rotation of bushing 92 is accomplished by locating stepped portions 104 on bushing top surface 102 with respect to indented stops 116 on bushing side surface 114 in a predetermined manner. More specifically, it will be recognized that indented stops 116 are spaced closer together than stepped portions 104. Therefore, there typically will be provided more indented stops 116 provided on bushing side surface 114 than stepped portions 104 on bushing top surface 102.

Figure 7:
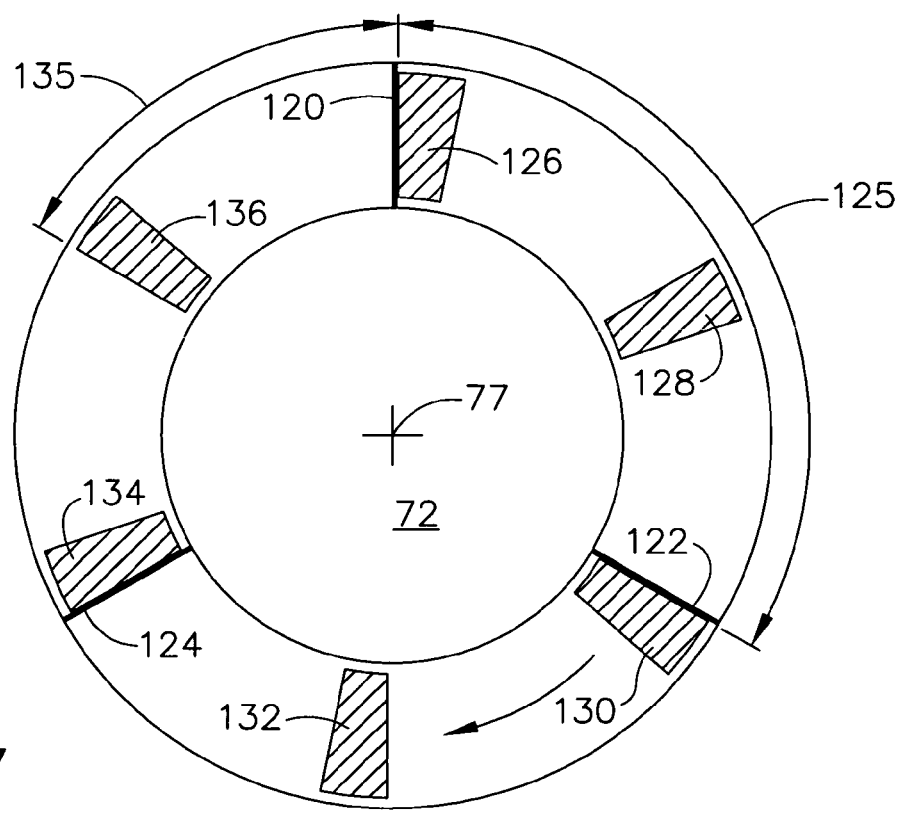
FIG. 7 is a top schematic view of the bushing depicted in FIG. 3 when the vane is in the fully closed position, with the lever pawls being shown in relation to the stepped surfaces thereof.

In an exemplary configuration, it will be seen in the schematic representation in FIG. 7 that three stepped portions 120, 122 and 124 are spaced substantially symmetrically on bushing top surface 102 a predetermined amount 125 (e.g., approximately 120° apart). Lever arm pawls 126, 128, 130, 132, 134 and 136 are spaced at predetermined intervals 135 (e.g., approximately 60°) on lever arm bottom surface 110. It will be appreciated that variable vane 70 is in the closed position in FIG. 7 and that lever arm pawls 126, 130 and 132 are driving against stepped portions 120, 122 and 124, respectively.

Figure 8:
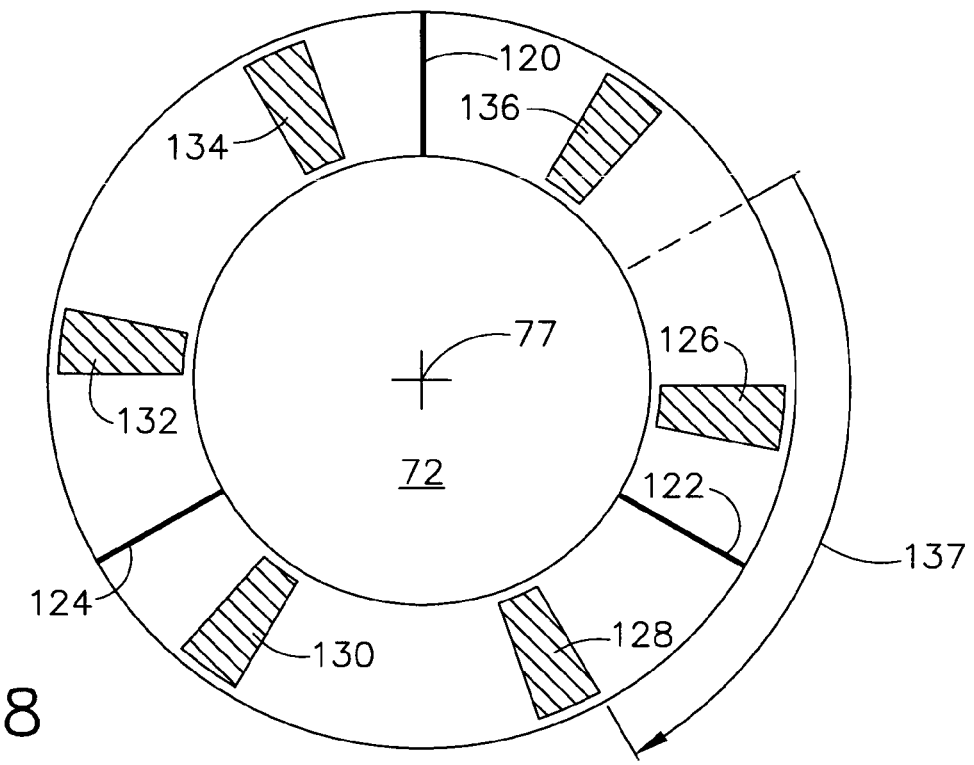
FIG. 8 is a top schematic view of the bushing depicted in FIG. 3 after the vane is moved from the fully closed position in FIG. 7 to the fully open position, with the lever pawls being shown in relation to the stepped surfaces thereof.

As variable vane 70 is moved to an open position in FIG. 8, lever arm pawls 126, 128 130, 132, 134 and 136 move clockwise a predetermined amount 137 (approximately 90°). Thus, it will be seen that sixth lever arm pawl 136 will be driven up an incline and drop off of first stepped portion 120. Likewise, second lever arm pawl 128 will be driven up an incline and drop off second stepped portion 122 and fourth lever arm pawl 132 will be driven up an incline and drop off third stepped portion 124. For their part, first lever arm pawl 126 is located on top of the incline between first stepped portion 120 and second stepped portion 122, third lever arm pawl 130 is located on top of the incline between second stepped portion 122 and third stepped portion 124, and fifth lever arm pawl 134 is located on top of the incline between third stepped portion 124 and first stepped portion 120. It will also be noted that second lever arm pawl 128, fourth lever arm pawl 132 and sixth lever arm pawl 136 are approximately 30° from second stepped portion 122, third stepped portion 124 and first stepped portion 120, respectively.

As variable vane 70 moves from the open position to the closed position, second lever arm pawl 128, fourth lever arm pawl 132 and sixth lever arm pawl 136 engage second stepped portion 122, third stepped portion 124 and first stepped portion 120, respectively, and drive bushing 92 counter-clockwise a predetermined amount 140. It will also be understood that pawl 118 on casing tower cylindrical portion 86 will engage an indented stop 116 on bushing side surface 114. Accordingly, it will be appreciated that bushing 92 has rotated an incremental amount (approximately 60° in the exemplary configuration) in the counter-clockwise direction from its initial position prior to the cycling of variable vane 70.

Figure 9:
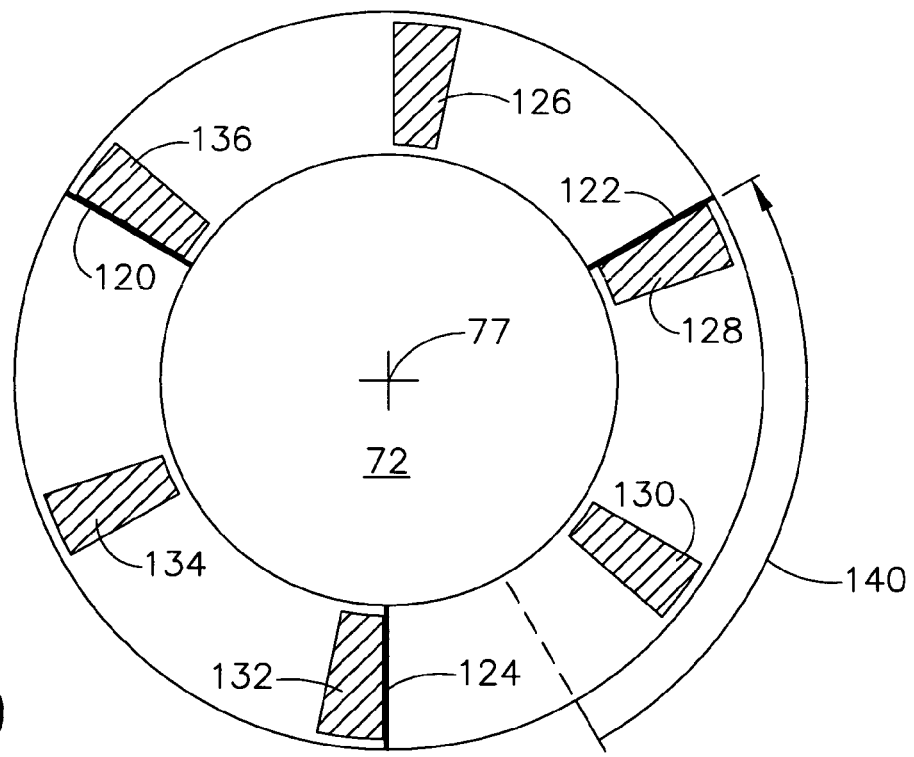
FIG. 9 is a top schematic view of the bushing depicted in FIG. 3 after the vane is moved from the fully open position in FIG. 8 back to the fully closed position, with the lever pawls being shown in relation to the stepped surfaces thereof; and, FIG. 10 is an enlarged, partial view of a variable vane assembly having an alternative bushing configuration.

For the exemplary configuration disclosed in FIGS. 7-9, it would take six cycles of opening and closing variable vane 70 for bushing 92 to make a complete rotation (or return to its original position). Therefore, it will be understood that a full rotation of bushing 92 is a function of the number of cycles in which variable vane moves between the closed position and the open position, which, in turn, is a function of the number of lever arm pawls 112 and stepped portions 104 on bushing top surface 102. By incrementally rotating bushing 92 in this manner, it is expected that the life of such bushing could be increased by six times.

Figure 10:
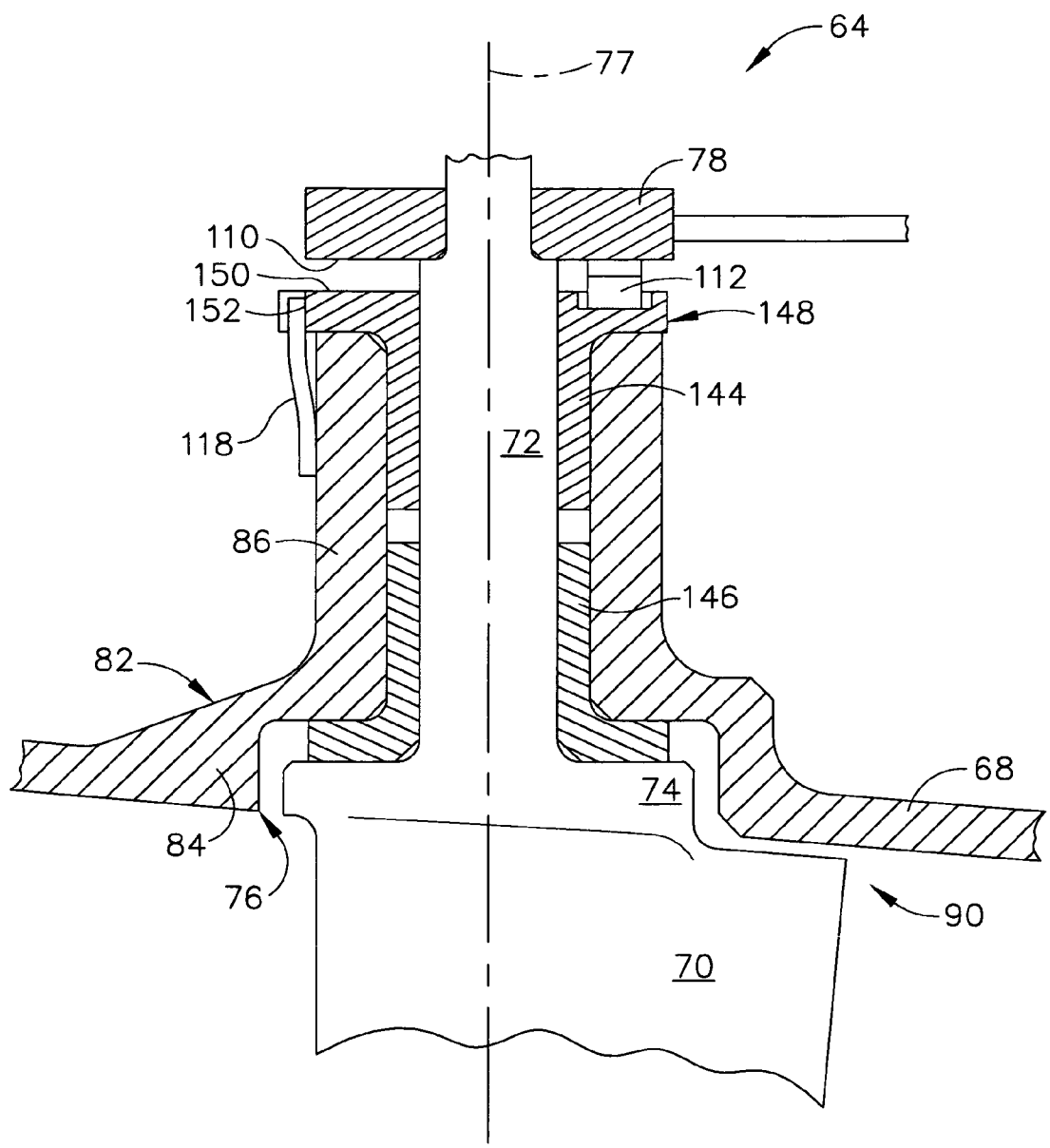

An alternative configuration for bushing 92 is depicted in FIG. 10, where an outer radial bushing 144 is positioned adjacent lever 78 and an inner radial bushing 146 is positioned adjacent vane platform 74. It will be appreciated that a top portion 148 of outer radial bushing 144 is configured substantially the same as top portion 94 of bushing 92 so that stepped portions are provided on a top surface 150 thereof (corresponding to stepped portions 104 on bushing top surface 102). Therefore, lever arm pawls 112 will engage outer radial bushing in the same manner as for bushing 92. Similarly, outer radial bushing 144 includes a side surface 152 which includes a plurality of indented stops (corresponding to indented stops 116 on bushing side surface 114). In this way, pawl 118 on casing tower cylindrical portion 86 is able to engage such indented stops and perform as described hereinabove. Of course, it will be noted that inner radial bushing 146 is positioned between vane platform 74 and casing tower recessed portion 84 so that washer 98 is no longer desired.

Having shown and described the preferred embodiment of the present invention, further adaptations of the bushing configuration and the variable vane assembly, as well as the process for coupling a variable vane assembly to a casing, can be accomplished by appropriate modifications by one of ordinary skill in the art without departing from the scope of the invention.

What is claimed is:

1. A variable vane assembly for a gas turbine engine including a casing, said variable vane assembly comprising:
    (a) a variable vane including a platform and a vane stem extending outwardly from said platform;
    (b) a bushing surrounding said vane stem;
    (c) a lever for moving said vane between a closed position and an open position; and,
    (d) a mechanism for incrementally rotating said bushing to a new circumferential position with respect to said vane stem as said vane is cycled each time between said closed and open positions.

2. The variable vane assembly of claim 1, said bushing including a plurality of stepped portions circumferentially spaced about a top surface of said bushing.

3. The variable vane assembly of claim 2, further comprising a plurality of pawls associated with said lever, wherein said pawls engage one of said stepped portions of said bushing top surface to cause said bushing to rotate in a first direction a predetermined amount as said vane moves from said closed position to said open position.

4. The variable vane assembly of claim 2, said bushing including a plurality of indented stops circumferentially spaced about a side surface of said bushing.

5. The variable vane assembly of claim 4, further comprising at least one pawl associated with said casing which engages one of said indented stops of said bushing side surface to prevent said bushing from rotating in a second direction opposite said first direction more than a second predetermined amount as said vane moves from said open position to said closed position.

6. The variable vane assembly of claim 4, wherein said stepped portions of said bushing top surface and said indented stops of said bushing side surface are located with respect to each other in a predetermined manner.

7. The variable vane assembly of claim 2, wherein said stepped portions on said bushing top surface are spaced approximately 120° apart.

8. The variable vane assembly of claim 3, wherein said lever pawls are spaced approximately 60° apart.

9. The variable vane assembly of claim 3, wherein said lever pawls are spaced closer together than said stepped portions on said bushing top surface.

10. The variable vane assembly of claim 4, wherein said indented stops on said bushing side surface are spaced closer together than said stepped portions on said bushing top surface.

11. The variable vane assembly of claim 4, wherein more of said indented stops on said bushing side surface are provided than said stepped portions on said bushing top surface.

12. The variable vane assembly of claim 3, wherein the distance between said lever pawls is less than the rotation of said vane between said open and closed positions.

13. The variable vane assembly of claim 1, wherein a full rotation of said bushing is a function of the number of cycles in which said vane moves from said closed position to said open position.

14. The variable vane assembly of claim 3, wherein a full rotation of said bushing is a function of a number of lever pawls and said stepped portions on said bushing top surface.

15. The variable vane assembly of claim 1, wherein said bushing extends from adjacent said lever to adjacent said platform for said vane.

16. The variable vane assembly of claim 15, further comprising a washer positioned between a bottom surface of said bushing and a top surface of said platform for said vane.

17. The variable vane assembly of claim 1, said bushing further comprising a radially outer bushing positioned adjacent said lever and a radially inner bushing positioned adjacent a platform for said vane.

18. A method of incrementally rotating a bushing surrounding a vane stem in a variable vane assembly during a cycle of opening and closing a vane thereof, comprising the following steps:

(a) incorporating a mechanism for engaging said bushing;

(b) rotating said bushing in a first direction a predetermined amount as said vane moves from a closed position to an open position; and, (c) rotating said bushing in a second direction opposite said first direction less than said predetermined amount as said vane moves from said open position to said closed position.

19. The method of claim 18, further comprising the step of incorporating a mechanism for preventing said bushing from rotating in said second direction more than a second predetermined amount.

20. The method of claim 18, wherein said bushing is in a new circumferential position with respect to said vane stem after each said cycle.

* * * * *